March 2, 1965   R. R. FEATHERSTON   3,171,467
CARBURETOR CONTROL

Filed July 3, 1962   2 Sheets-Sheet 1

INVENTOR.
ROBERT R. FEATHERSTON
BY
Attorneys

March 2, 1965  R. R. FEATHERSTON  3,171,467
CARBURETOR CONTROL

Filed July 3, 1962  2 Sheets-Sheet 2

INVENTOR.
ROBERT R. FEATHERSTON
BY
*McGrew & Edwards*
Attorneys

United States Patent Office 3,171,467
Patented Mar. 2, 1965

**3,171,467
CARBURETOR CONTROL**
Robert R. Featherston, 2517 Forest St., Denver 7, Colo.
Filed July 3, 1962, Ser. No. 207,314
2 Claims. (Cl. 158—36.3)

This invention relates to improvements in carburetion, and more particularly to improvements in the control of the flow of fuels through vehicle carburetors.

The well known function of the carburetor of an internal combustion engine is to provide a combustive mixture of vaporized fuel and air to the cylinders of the internal combustion engine. The majority of vehicles on the roads today are equipped with a float-controlled carburetor, which provides a small reservoir of fuel in the carburetor itself from which fuel is drawn by engine suction into the engine intake manifold. While the float of the carburetor is intended to maintain a constant volume in the reservoir, actual operation of the float is far from the desired operation. Operating temperatures of the engine vary the operation of the float and produce a substantial fluctuation in the fuel level in the carburetor and thus affect the flow of fuel into the engine. At higher temperatures severe percolation occurs in the carburetor bowl greatly varying operation of the float. In a very short time after a hot engine is stopped, much of the fuel trapped in the fuel system, that is, the carburetor, fuel pump and the lines, feeds into the engine or evaporates by expansion. Also, after stopping, percolation caused by a hot engine causes flooding which kills the engine and makes subsequent starting very difficult. Starting is difficult at least until the engine cools sufficiently to prevent further percolation in the carburetor and flooding of the engine.

Additionally, the carburetor float is unbelievably sensitive to relative position of the vehicle as well as sloshing of the fuel in the bowl. Moderate driving causes float bobbing, and this bobbing of the float causes changes in fuel level producing excess fuel in the carburetor bowl. Such excessive fuel, of course, produces an over-rich fuel mixture passing into the engine. As a result of the over-rich mixture, smog (unburned hydrocarbons), poor gasoline mileage and unsatisfactory engine performance occurs. Actual smog tests have shown that the hydrocarbon emission from a gasoline engine during deceleration is several times that which occurs at a cruising speed of the same engine. Most engines flood out completely if the throttle is suddenly reduced during steep climbs, and many engines refuse to idle on even moderate inclines due to the flooding of the bowl by the tilted float. Some engines even flood out on a steep descent due to flooding of the bowl. In addition, engine stalling during quick stops and sluggishness on cornering are not unusual movements of the float during such maneuvers.

Momentum of the fuel in the lines is another factor producing excess fuel in the bowls. At high-power operation the demand of fuel to the engine is great, and the flow of fuel in the lines going to the engine can achieve a fairly high velocity. When the throttle is suddenly closed from such high fuel demands, the fuel demand reduces almost instantaneously, but the fuel flowing in the lines cannot stop instantaneously due to momentum. The momentum of this fuel in the lines, as well as the sloshing of the fuel in the bowl and the movement of the float, adds excess fuel to the bowl, flooding the engine. While over-size fuel lines might alleviate the momentum, the lines are then over-exposed to the high temperatures under the engine hood, particularly at low fuel demands which, of course, increases percolation in the carburetor.

According to the present invention I have provided an adjustable overflow for the carburetor bowl which insures a positive fuel level control in the bowl, preventing over-flowing of the bowl into the throat of the carburetor, thereby insuring efficient operation of the engine, reducing gasoline consumption, and reducing smog production from over-rich fuel mixtures. The device is arranged either as an attachment to an existing carburetor or as a built-in portion of a carburetor as manufactured. The invention further provides means for control of the fuel in a carburetor, whether the vehicle fuel tank is above or below the carburetor.

Included among the objects and advantages of the present invention is a positive control for the fuel level in a carburetor, which provides a method for maintaining a positive level of fuel in the carburetor bowl in relation to its outlet jet, thereby producing more efficient operation of the carburetor and the engine. The invention provides an effective, inexpensive smog control for gasoline vehicles. The invention, additionally, provides means for accurately controlling the level of fuel in the carburetor bowl, regardless of the movement of the float, thereby preventing carburetor flooding and an over-rich mixture to the engine, increasing automobile efficiency and reducing smog production.

These and other objects and advantages of the present invention may be readily ascertained by referring to the following description and appended illustrations in which.

Figure 1:
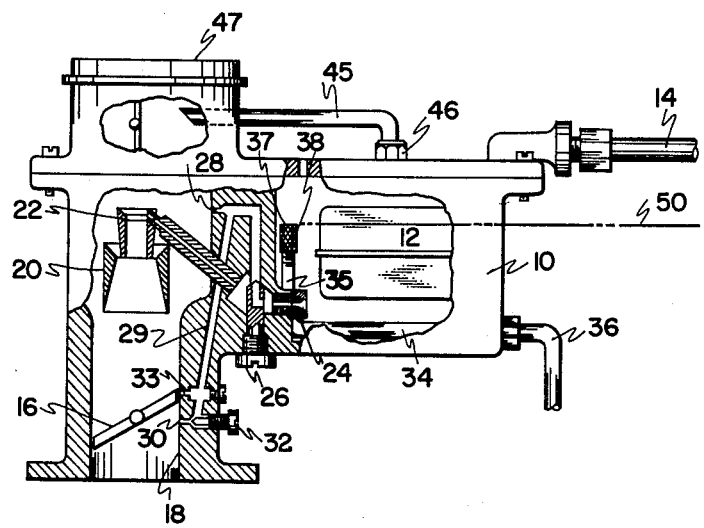
FIG. 1 is a side elevational view, partially cut-away, of a carburetor utilizing a form of the present invention.

In one form in a typical installation, the device, shown in FIG. 1, a carburetor (which may be any float controlled carburetor) includes a bowl portion 10 having a float 12 therein and a fuel inlet 14 which is controlled by a needle valve, not shown, interconnected with the float 12. Such connections are common and detailed explanation is merely repetitious of known art. In such a carburetor a butterfly valve 16 controls the intake to the engine manifold 18 and a venturi throat 20 provides suction for a metering orifice 22 which draws fuel from the bowl by an outlet 24. The outlet 24 also communicates with passage 29 feeding jets 28, 30 and 33. Jet 30 is controlled by valve 32. Similar carburetors have different jet arrangements, but all such carburetors may be provided with an overflow line from the bowl 10, as by means of a standpipe 35 integrally secured (or by threaded or other fitting where necessary) to line 34. Line 34 is connected, through the carburetor wall, to a return line 36.

The overflow standpipe 35 is placed adjacent the outlet port 24, which leads to the carburetor throat, so that the fluid level above the outlet is accurately controlled. The standpipe 35 is installed in the carburetor bowl by forming a hole in the bowl wall and inserting line 34 therethrough with the standpipe in place. The standpipe is provided with an adjustable inlet 37 threaded thereon. An adapter nut 40 provides means for attachment to the line 34 to the bowl wall and the return line 36 is secured thereto by means of a nut 41 which threads into the adapter 40 with a seal ring 42 therebetween.

A vapor release line 45 is secured to the top of the bowl by means of an adapter nut 46 and the vapor release line communicates with the air inlet 47 of the carburetor.

This provides an escape for any vapor resulting from percolation in the carburetor. In this manner vapor under pressure from percolating fuel is relieved from the carburetor and the vaporous fuel is passed into the engine.

Figure 2:
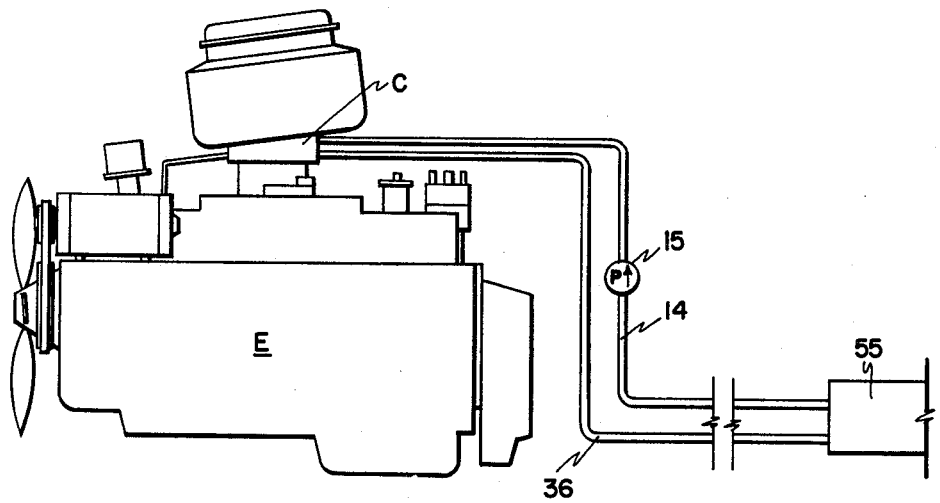
FIG. 2 is a schematic view of the fuel flow lines of a vehicle engine having a device according to the invention installed thereon.

After installation of the overflow in the carburetor, FIG. 2, the return line 36 is interconnected with the fuel tank 55 so that any excess fuel which would tend to fill the bowl above a predetermined fuel level 50 corresponding with the inlet 37 to the overflow standpipe when the carburetor is level, is returned to the fuel tank itself. Schematically shown, the return line 36 is interconnected to carry the overflow fuel to the tank 55, while the feed line 14 from the tank 55 is connected through a fuel pump 15 to the carburetor on the engine E.

The installation illustrated in FIG. 2 is fairly typical of vehicle engines wherein the carburetor is above the fuel tank so that excess fuel in the carburetor bowl will drain back by gravity into the fuel tank. In installations where the fuel tank is above the carburetor, a different arrangement must be provided. In this instance, I provide means comprising a small auxiliary reservoir which feeds directly into the fuel line ahead of the fuel pump. For this purpose, the device shown in FIG. 4 provides means for temporarily storing excess fuel until a predetermined amount is collected, then a float opens a valve into the main fuel line and the fuel is pumped normally into the main fuel system.

Figure 4:
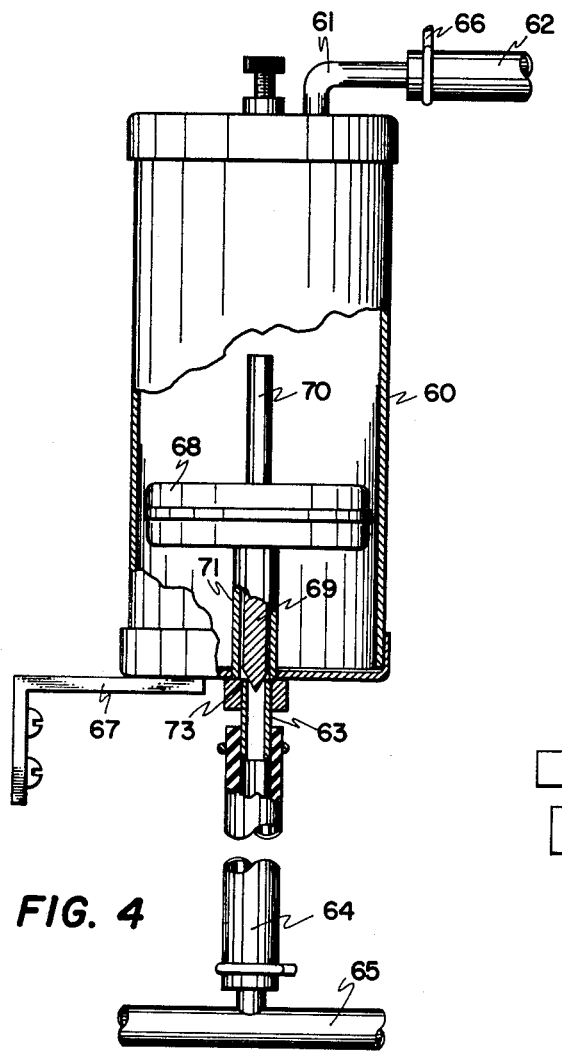
FIG. 4 is a side elevational view, partially cut-away, illustrating a secondary reservoir for use with the invention where a vehicle has a gas tank above the carburetor.
Figure 5:
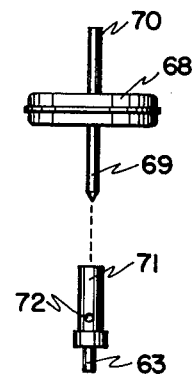
FIG. 5 is a detail view of the float mechanism of the secondary reservoir of FIG. 4.

A reservoir 60, FIG. 4, is provided with an upper inlet 61 which is connected by means of a flexible tube 62 to the return line 36 from a carburetor having an overflow standpipe, as shown in FIG. 1, and an outlet 63 interconnected through a flexible tube 64 to a main fuel line 65. The flexible tubes are connected by means of wire spring clamps 66 for ease of installation. The reservoir 60 is mounted by means of brackets 67 on an engine compartment wall. A float 68 is mounted to a needle valve 69, and an upper spindle 70 is mounted on the upper side of the float. The needle 69 is reciprocally mounted in a tube 71 having a side inlet opening 72 and an outlet passage 63 to which is attached the tube 64. The needle 69 seats on valve seat 73 in the tube 63 and provides means for shutting off the reservoir 60.

Figure 6:
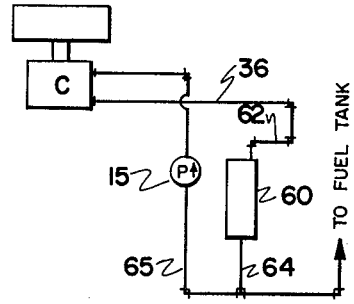
FIG. 6 is a schematic view of a typical installation where a second reservoir is required with a carburetor level control device according to the invention.
Figure 3:
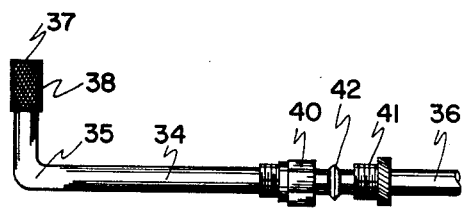
FIG. 3 is a side elevational detailed view of an overflow attachment arranged for installation in a carburetor.

In a typical installation, as shown in FIG. 6, a carburetor C is provided with a fuel line 65, fed from a fuel tank, not shown, with a fuel pump in the line 65. The carburetor is provided with an overflow standpipe 35 (not shown in this view) and a return line 36 interconnected with the tubing 62, which is interconnected with the inlet 61 leading into the reservoir 60. The outlet 63 of the reservoir 60 is directly connected into the fuel line 65 by means of the tubing 64, which connection is on the intake side of a fuel pump 15.

In operation, the carburetor normally gets its fuel from the tank through the pump and, in the event of an overflow, the excess fuel flows through line 36 into the reservoir 60. The fuel is accumulated in this reservoir until sufficient to raise the float 68, which permits the fuel to flow through the outlet 72 through the tubing 64 into the main fuel line 65. Since fluid flows along lines of least resistance, the fluid from the reservoir 60 will be drawn into the main fuel line since there is less resistance from it than from the fuel tank some greater distance away.

In the installation or adjustment of the engine and carburetor, the level desired in the bowl may be accurately predetermined by the adjustable head 38 on the standpipe 35. The threaded connection permits very accurate height adjustment of the outlet 37. By having the outlet 37 above the carburetor outlet 24 an accurate level control is achieved regardless of the attitude of the vehicle and thus eliminates flooding.

While the invention has been described by reference to a specific device, there is no intent to limit the spirit or scope thereof except as defined in the following claims.

I claim:

1. In a vehicle having an internal combustion engine and a float controlled carburetor bowl with a fuel outlet through a side wall thereof, the improvement which comprises a standpipe in the bowl of said carburetor having an inlet mounted above the fuel outlet of the carburetor bowl when said vehicle is level and in close proximity to said wall having the fuel outlet, a fuel return line interconnected with said standpipe and arranged to drain overflowing fuel from the bowl into the fuel supply of said vehicle, and means mounting said standpipe in a predetermined position.

2. In a vehicle having an internal combustion engine and a float controlled carburetor bowl with a fuel outlet through a side thereof, the improvement which comprises a standpipe mounted in the bowl of said carburetor in close proximity to the fuel outlet of the carburetor bowl, an inlet variably mounted on said standpipe positioned above said fuel outlet when said vehicle is level, a fuel return line interconnected with said standpipe and arranged to drain overflowing fuel into the fuel supply of said vehicle, and means mounting said standpipe in a predetermined position.

References Cited in the file of this patent

UNITED STATES PATENTS

| | | |
|---|---|---|
| 1,025,814 | Lemp | May 7, 1912 |
| 2,633,342 | Baker | Mar. 31, 1953 |
| 2,695,029 | Bruegger | Nov. 23, 1954 |
| 2,965,086 | Gregory et al. | Dec. 20, 1960 |

FOREIGN PATENTS

| | | |
|---|---|---|
| 766,291 | Great Britain | Jan. 16, 1957 |